US010855647B2

(12) United States Patent
Yasrebi et al.

(10) Patent No.: US 10,855,647 B2
(45) Date of Patent: Dec. 1, 2020

(54) SYSTEMS AND METHODS FOR PROVIDING ENUM SERVICE ACTIVATIONS

(71) Applicant: AT&T Intellectual Property I, L.P., Atlanta, GA (US)

(72) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 295 days.

(21) Appl. No.: 15/831,496

(22) Filed: Dec. 5, 2017

(65) Prior Publication Data

US 2019/0173833 A1    Jun. 6, 2019

(51) Int. Cl.
*H04L 29/12* (2006.01)
*H04L 12/24* (2006.01)
*H04L 29/06* (2006.01)

(52) U.S. Cl.
CPC .......... *H04L 61/157* (2013.01); *H04L 41/046* (2013.01); *H04L 41/0681* (2013.01);
(Continued)

(58) Field of Classification Search
CPC ....... H04L 41/04; H04L 41/046; H04L 41/06; H04L 41/0681; H04L 41/0803;
(Continued)

(56) References Cited

U.S. PATENT DOCUMENTS 7,072,653 B1    7/2006 Sladek et al.
7,313,631 B1    12/2007 Sesmun et al.
(Continued)

FOREIGN PATENT DOCUMENTS

CN    1956413 A    5/2007
EP    1434449 B1    11/2005
(Continued)

OTHER PUBLICATIONS

Falstrom, P., "E.164 Number and DSN", Internet Engineering Task Force, Request for Comments 2916, Sep. 2000. (Year: 2000).*
(Continued)

*Primary Examiner* — Michael Won
*Assistant Examiner* — William C McBeth
(74) *Attorney, Agent, or Firm* — BakerHostetler

(57) ABSTRACT

A method and apparatus performing operations including instantiating at least one ENUM physical server instance or vENUM virtual machine, wherein the at least one vENUM virtual machine initiating an IMSI session for at least one of a service and a record. The operations further include determining when the at least one of the service and the record is operating. When the at least one of the service and the record is operating, determining if the service was disabled, and if the service was disabled, clear any alarm and announcing service disabled via input/output device. When the at least one of the service and the record is not operating, the operations may include generating an alarm via input/output device, determining if automatic disablement is permitted, and if permitted, automatically disable the at least one of the service and the record. When automatic disablement is not permitted, the operations may include prompting for a disablement instruction via an input/output device and disabling the at least one of the service and the record upon receiving the disablement instruction.

20 Claims, 16 Drawing Sheets

(52) U.S. Cl.
CPC ...... *H04L 41/0806* (2013.01); *H04L 61/1511* (2013.01); *H04L 65/1016* (2013.01); *H04L 65/1046* (2013.01); *H04L 65/1066* (2013.01); *H04L 65/1069* (2013.01)

(58) Field of Classification Search
CPC ............. H04L 41/0806; H04L 41/0813; H04L 41/0816; H04L 61/15; H04L 61/1505; H04L 61/1511; H04L 61/157; H04L 65/1016; H04L 65/1046; H04L 65/1066; H04L 65/1069; H04M 3/42102; H04M 3/4211; H04M 3/523; H04M 7/123; H04M 7/125; H04M 7/128
See application file for complete search history.

(56) References Cited

U.S. PATENT DOCUMENTS

| | | | |
|---|---|---|---|
| 8,306,571 | B2 | 11/2012 | Larsson |
| 8,326,265 | B2 | 12/2012 | Nooren et al. |
| 8,422,991 | B2 | 4/2013 | Lazaridis |
| 8,515,392 | B2 | 8/2013 | Chen et al. |
| 8,755,797 | B2 | 6/2014 | Ahmavaara et al. |
| 8,792,481 | B2 | 7/2014 | Ku |
| 8,798,589 | B2 | 8/2014 | Smith et al. |
| 8,804,494 | B1 | 8/2014 | Uberoy |
| 9,485,252 | B2 | 11/2016 | Wane |
| 9,557,889 | B2 | 1/2017 | Raleigh et al. |
| 9,565,552 | B2 | 2/2017 | Mohammed et al. |
| 2002/0131395 | A1 | 9/2002 | Wang |
| 2005/0021592 | A1 | 1/2005 | Patel et al. |
| 2005/0182781 | A1 | 8/2005 | Bouvet |
| 2007/0061397 | A1* | 3/2007 | Gregorat ............... H04L 61/157 709/203 |
| 2009/0154452 | A1 | 6/2009 | Ku et al. |
| 2010/0027412 | A1* | 2/2010 | Yang ................... H04L 65/1043 370/216 |
| 2010/0098234 | A1* | 4/2010 | Ku .................... H04M 3/42008 379/210.02 |
| 2010/0150145 | A1 | 6/2010 | Ku |
| 2012/0182939 | A1 | 7/2012 | Rajan et al. |
| 2013/0294443 | A1 | 11/2013 | Kahn |
| 2014/0066047 | A1 | 3/2014 | Qiang |
| 2014/0086177 | A1 | 3/2014 | Adjakple et al. |
| 2014/0220971 | A1 | 8/2014 | Jacobs et al. |
| 2014/0344153 | A1 | 11/2014 | Raj et al. |
| 2014/0370845 | A1 | 12/2014 | Mishkin |
| 2015/0023220 | A1* | 1/2015 | Ku ..................... H04L 65/1069 370/259 |
| 2015/0063166 | A1 | 3/2015 | Sif et al. |
| 2015/0242644 | A1 | 8/2015 | Sonasath |
| 2015/0312761 | A1 | 10/2015 | Subramanian et al. |
| 2016/0014597 | A1 | 1/2016 | Tuchman et al. |
| 2016/0048298 | A1 | 2/2016 | Choi et al. |
| 2016/0048640 | A1 | 2/2016 | Chung et al. |
| 2016/0057291 | A1 | 2/2016 | Iyer et al. |
| 2016/0127863 | A1 | 5/2016 | Yoon et al. |
| 2016/0150413 | A1 | 5/2016 | Meredith et al. |
| 2016/0286597 | A1 | 9/2016 | Eriksson |
| 2017/0031700 | A1* | 2/2017 | Yasrebi ................. H04L 61/157 |
| 2017/0034346 | A1* | 2/2017 | Yasrebi ............. H04M 3/42297 |
| 2017/0118679 | A1 | 4/2017 | Li et al. |
| 2017/0353608 | A1* | 12/2017 | Li ....................... H04L 65/1069 |

FOREIGN PATENT DOCUMENTS

| | | |
|---|---|---|
| WO | WO 2002/096128 A2 | 11/2002 |
| WO | WO 2011/140056 A2 | 11/2011 |
| WO | WO 2017/081059 A1 | 5/2017 |

OTHER PUBLICATIONS

Ben et al.; "Contextual Connectivity in Multi-Access Architectures"; HAL archives-ouvertes; 2014; 204 pages.

"Real-Time SIM Activation"; http://www.gemalto.com/mobile/networks/real-time-sim-activation/sim-activation; gemalto; © 2006-2017; accessed Jun. 16, 2017; 3 pages.

"MME Administration Guide, StarOS Release 21"; http://www.cisco.com/c/en/us/td/docs/wireless/asr_5000/21/MME/b_21_MME_Admin/b_21_MME_Admin_chapter_01.html; Cisco; Oct. 27, 2016; accessed Jun. 16, 2017; 64 pages.

* cited by examiner

SYSTEMS AND METHODS FOR PROVIDING ENUM SERVICE ACTIVATIONS

TECHNICAL FIELD

The technical field relates generally to communication networks and more particularly to Internet Protocol (IP) connections between IP carriers. More particularly, the technical field relates to ENUM service activations or deactivations.

BACKGROUND

A large number of connections between devices, such as telephone calls, are now being carried via packet-switched networks. IP networks have evolved to allow users to send voice and data, including telephone calls, through packet-switched networks, such as the Internet, instead of through older networks like the PSTN. Accordingly, networks often utilize the Internet Protocol (IP), which is the basic transmission protocol used for Internet communications, to form these connections. For carriers to provide service to subscribers by using IP networks, however, it is necessary for networks to interconnect so that their subscribers can connect to each other.

Providing such interconnection generally involves a mechanism by which calls that are intended for disparate networks are sent through egress routing nodes of one network to gateway nodes of other networks. To the extent that one of the available networks recognizes that the destination device resides on it, the network will take steps to route the call to the destination device. A tElephone NUmber Mapping (ENUM) system infrastructure includes a suite of protocols and architecture designed by the Internet Engineering task force to unify the E.164 telephone numbering system with the IP addressing system.

Within the ENUM infrastructure, IP component/network may access naming authority pointer (NAPTR) resources including services and/or records associated with such services. It is of interest to de-activate services due to a variety of reasons including IP component/network failures, or security issues. Various concerns, including service continuity and security concerns can require that service de-activation and re-activation (when appropriate) be made as fast as possible (e.g., in case of changing demands on connectivity and emergencies and recoveries from emergencies). The predominant name server (NS) syntax is the BIND syntax. This syntax is complex, error-prone, and requires extensive and time-consuming file modifications to allow for programmatic changes to remove selected service records. This drawback is magnified when there are numerous records. Telecommunications providers often manage tens of millions of service records, and this number expected to grow as more services migrate to IP devices that interact with telecommunications networks, such as, mobile devices, smart vehicles and other internet of things applications.

Various IP based multimedia session instantiated (IMSI) services can be encoded/categorized using naming authority pointer (NAPTR) records. New services are introduced over time. Likewise, service subscriptions may lapse over time or causes may arise making it necessary to deactivate a service/record. For example, it may be necessary to de-activate one or more such services due to temporary component failures and fall-back to circuit-switched operation modes. Services may need to be reactivated once a fault is resolved or when activation is performed in stages. With the increased demand for services and propagation of services to packet based networks, a need exists for more efficient activation/deactivation of services and or service records.

SUMMARY

The examples herein provide a more efficient service/record activation/deactivation system. In one example, service/record activation/deactivation is applied automatically to improve efficiency and remove the need to modify BIND code with each activation/deactivation.

According to another example, a network device comprises a processor, and memory storing instructions that cause the processor to effectuate service activation operations. The operations may include instantiating at least one ENUM physical server instance or an ENUM virtual machine (vENUM), wherein the at least one vENUM virtual machine initiating an IMSI session for at least one of a service and a record. The operations may further include determining if the at least one of the service and the record is operating. When the at least one of the service and the record is operating, determining if the service was disabled, and if the service was disabled, clear any alarm and announcing service disabled via input/output device. When the at least one of the service and the record is not operating, the operations may include generating an alarm via input/output device, determining if automatic disablement is permitted, and if permitted, automatically disable the at least one of the service and the record. When automatic disablement is not permitted, the operations may include prompting for a disablement instruction via an input/output device and disabling the at least one of the service and the record upon receiving the disablement instruction.

According to another example, an apparatus comprises at least one agent communicating with at least one of a fault, configuration, accounting, performance, and security module. The at least one agent can also communicate with at least one CSCF. The agent comprising a processor; and memory coupled to the processor, and an input/output device, the memory comprising executable instructions that cause the processor to effectuate operations including determining that a service is operating properly; if the service is operating properly and the service is disabled, enable the service; if the service is not operating properly, then generate an alarm and if the service is enabled, disable the service.

BRIEF DESCRIPTION OF THE DRAWINGS

Aspects of the herein described systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
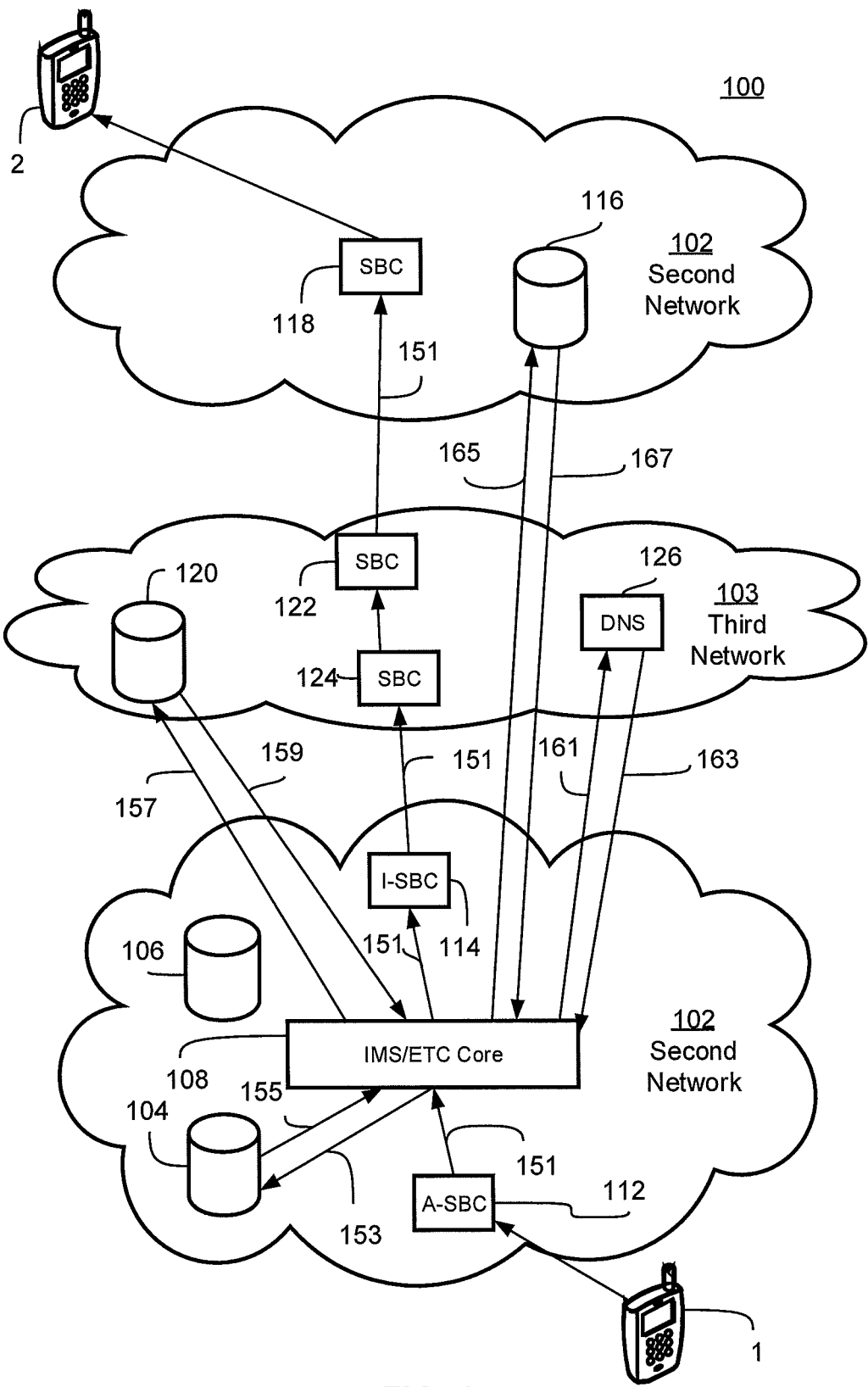
FIG. 1 depicts a system and method for inter-carrier routing of IP network connections through employment of the principles described herein.

Referring to FIG. 1, a system 100 is shown that includes at least on instance of a device 1 operating on a first network 101, at least one instance of a device 2 operating on a second network 102, and a third network 103 interconnecting the first network 101 and the second network 102. In one example, first network 101 represents a network operated by a first carrier of IP based telecommunication services and second network 102 represents a network operated by a second carrier of IP based telecommunication services. Third network 103 in one example is an IP exchange (IPX) network. An IPX network in one example is generally a network operated by a plurality of network carriers to provide for inter-network exchange of data between carriers. [Prefer 2 network system. See draft figure from Mehrad.]

It should be noted that the depiction in FIG. 1 is provided for illustrative purposes only and not to limit the disclosure to the example shown therein. The principles described herein are scalable to a greater or lesser number of networks and carriers than what are shown in FIG. 1. For example, third network 103 may be omitted and the principles herein may be operated with respect to internetwork communication between first network 101 and second network 102. Further, at least on instance of first network device 1 and at least one instance of second network device 2 are shown to describe illustrative operations, but many such devices may be operating throughout the networks comprising system 100.

Referring further to FIG. 1, first network device 1 and second network device 2 in one example are telecommunications devices that engage in network telecommunications to exchange data. Examples of such devices include network device 300 (FIG. 3) and UE 414 (FIG. 4). Such devices may also be referred to herein as subscribers, terminals or endpoints. Such devices will at times be initiating or originating devices and at times be recipient or terminating devices. For illustrative purposes only, first device 1 will be described as an originating device and second device 2 will be described as a recipient device. It should be understood, however, that their roles may be reversed.

Similarly, first network 101 will be described in greater detail than second network 102 and third network 103. However, the hardware, software, architecture, and functionality of first network 101 are applicable to second network 102 and third network 103. Finally, for brevity, an exhaustive network diagram has not been provided for each of the networks 101, 102, 103, but it should be understood that the depiction of networks 101, 102, and 103 represent the hardware, software, architecture, and functionality of telecommunications networks known to those in the art. Finally, the block diagrams shown herein are for illustrative purposes only. Accordingly, certain functionality is shown as standalone whereas other functionality is combined. It should be understood that components shown in the figures and described herein may be combined or divided as part of a distributed processing environment. Exemplary hardware and network configurations applicable to system and the component therein is described in connection with FIGS. 3-10.

Referring further to FIG. 1, first network 101, second network 102, and third network 103 in one example include an tElephone NUmber Mapping (ENUM) system. ENUM is a suite of protocols and architecture designed by the Internet Engineering task force unify the E.164 telephone numbering system within the IP addressing system. The present disclosure will not provide an in-depth description of the ENUM standard, but will focus on those portions needed to describe the principles set forth herein. Nevertheless, an exemplary description of ENUM terminology, protocols, and infrastructure can be found in U.S. Pat. No. 8,792,481, entitled "Methods, systems, and computer program products for providing inter-carrier IP-based connections using a common telephone number mapping architecture", which is hereby incorporated by reference in its entirety.

One characteristic of ENUM is a hierarchy of data that are used by networks to identify routing information to establish connections between the various devices that are residing thereon. A multiple-tiered data structure can be used to provide carriers with the ability to form connections between various devices without necessarily sharing network architectures or other information.

Carriers using ENUM have access to a lookup method to obtain Naming Authority Pointer Resource (NAPTR) records associated with various devices residing on other networks. A NAPTR record can be received from a network-based Domain Name Server (DNS) database and is indexed on the E.164 telephone number of a device. A NAPTR record includes, among other things, information that designates how a device can be contacted. For example, a NAPTR record may designate what types of communications a device can establish, such as a VoIP connection using Session Initiation Protocol (SIP), a voice connection using the E.164 telephone number, a short message service (SMS) or multimedia message service (MMS) session, etc. The NAPTR may provide a uniform resource identifier (URI) that identifies how to contact the terminal to use a selected service, and may designate a priority for each of the various connection methods. ENUM infrastructure can include a plurality of tiered databases that can be utilized to locate subscriber devices on the various networks making up an infrastructure. For the purposes of the present disclosure, three such database examples will now be described.

First, a private ENUM database generally provides routing information for subscribers within a single network operated by a particular communication service provider. If a request is received from an originating device on a network to call a device having a particular number, the network will first check the private (e.g., Tier 3) ENUM database. If the number resides in the private ENUM database, then the recipient device also resides on the network and the two devices may be connected. If the private ENUM database does not have a record for the number, then it is understood that the recipient device may reside on an external network. Accordingly, the originating network needs a mechanism to determine on what network the recipient device resides and how to connect with the recipient device. Tier 1 (e.g., international) and Tier 2 (e.g., national) ENUM databases can be used for this purpose. Note that tier numbers are used herein for examples only, and other numbers may be used, and/or such databases may be combined and arranged in various manners.

A Tier 1 ENUM database in one example may provide name server (NS) records that provide routing information that is known to the Tier 1 database, but is not known to a private ENUM database. For example, a Tier 1 (international) database may identify network databases of other networks in other countries/regions. Accordingly, a Tier 1 database may provide the name of a network for another regional/national carrier with records stored in a Tier 2 database. The target number of a session from originating network may then be resolved by a private ENUM (Tier 3) private database of the other carrier to receive information needed to complete a call. In one example, a Tier 2 ENUM database may directly process queries from many different communications providers. For example, one network may include the functionality to issue queries to Tier 2 ENUM databases of other networks to obtain routing information for calls addressed to terminals within other networks. The routing information provided by the Tier 2 ENUM database may not provide full routing information in response to a query. Rather, a Tier 2 ENUM database may only provide information sufficient to identify a network entry point or gateway that can be used to route a communication to a particular terminal. Thus, a Tier 2 ENUM database may provide information that is sufficient to allow another carrier to route a call to a terminal without providing complete routing information to the other carrier.

Referring now to FIG. 1, an illustrative example of an ENUM infrastructure in accordance with the principles described herein is generally indicated at 100. It should be noted that although the principles described herein are directed to a specific ENUM infrastructure, they are also generally applicable to various other networks and system infrastructures. A first network 101 in one example includes private ENUM database 104, Tier 2 ENUM database 106, within an IP multimedia system (IMS) and egress transfer component (ETC) core 108 (referred to further herein as IMS/ETC Core 108), access edge session boarder controller (A-SBC) 112, and interconnected session border controller (I-SBC) 114.

In one example, private ENUM database 104 provides routing data solely for terminal devices (e.g. device 1) that operate on first network 101. In one example, private ENUM database 104 may include routing data for terminal devices that reside on certain other networks. For example, the carriers operating first network 101 and second network 102 may partner to create efficient interconnectivity between their networks. Accordingly, private ENUM database 104 may provide routing data for first network devices 1 and second network devices 2. In one example, the routing data for first network devices 1 may include enough routing data to effect a connection between two or more first network devices 1 operating on first network 101. In one example, the routing data for second network devices 2 may be sufficient routing data to establish a connection between a first network device 1 and a second network device 2. In another example, the routing data for second network device 2 may provide a pointer or indicator identifying where such data may be found. For instance, private ENUM database 104 may include an entry for a second network device 2 pointing to Tier 1 ENUM database 120 of third network 103 and/or Tier 2 ENUM database 116 of second network 102.

Referring further to FIG. 1, ENUM database 106 residing on first network 101 provides routing data for second network device 2 to establish connections with devices on other networks, such as first network device 1. For example, if a second network device 2 were to initiate a call with first network device 1, ENUM database 106 may provide routing data to second network 102 to establish a call or connection between the first network device 1 and the second network device 2. In one example, this routing data may not represent complete routing data, but may provide an address for a component for first network device 1 to utilize in connecting with second network device 2. It should be noted that the database configuration depicted in FIG. 1 is provided for illustrative purposes only and other configurations are possible. For instance, Private ENUM database 104 and ENUM database 106 could be the same database.

Referring still to FIG. 1, IMS/ETC core 108 comprises the hardware and/or software components that provide the architectural framework and functionality for delivering IP multimedia communications services. IMS/ETC core 108 handles the establishment, maintenance and take-down of IP communication sessions. Thus, in first network 101, IMS/ETC core 108 handles the processing associated with establishing and maintaining IP connections, as well as the use of routing for non-IP connections. In addition IMS/ETC core 108 includes egress transfer functionality that is employed to establish internetwork connectivity between device operating on different networks.

Figure 2:
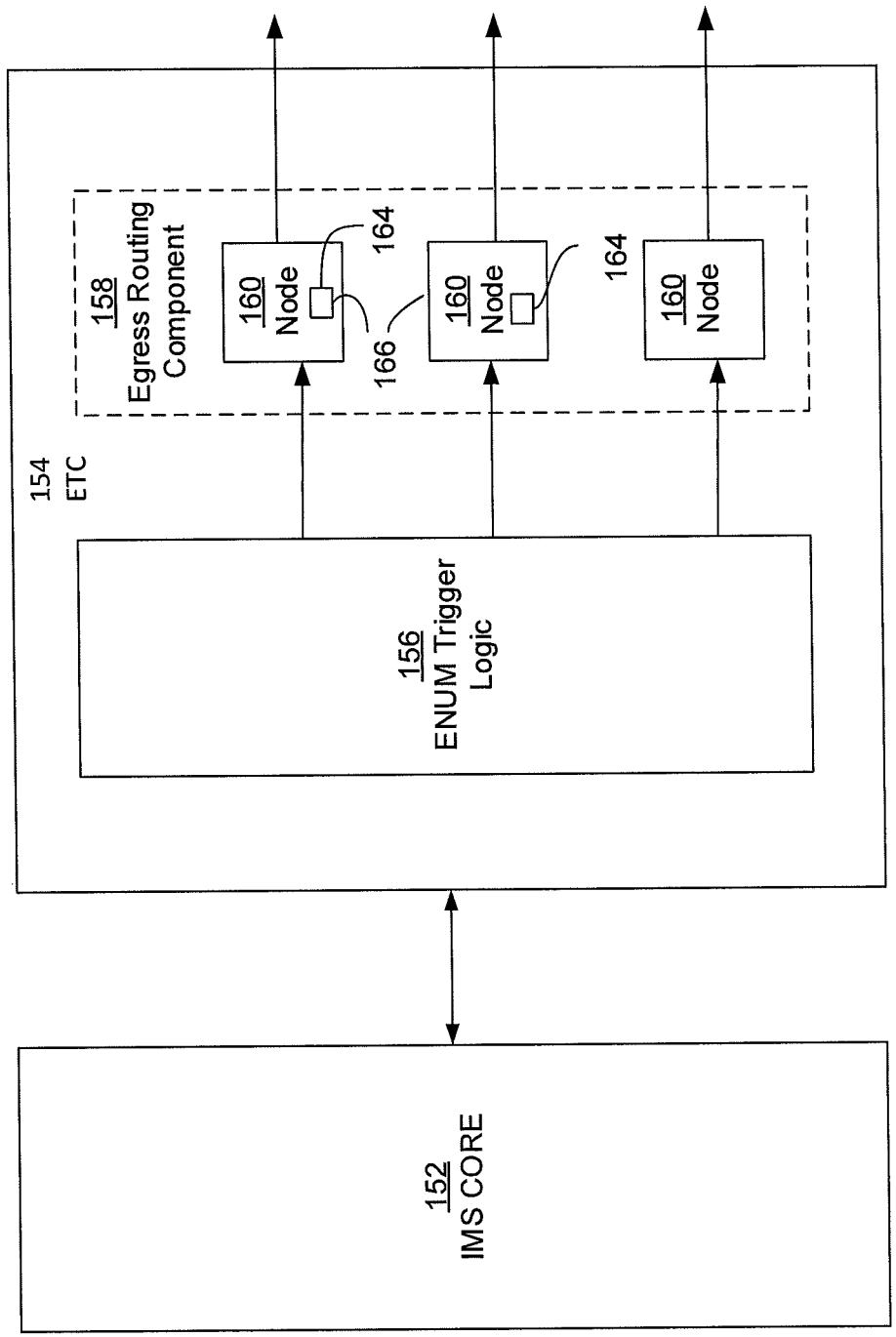
FIG. 2 depicts one example of a core architecture employable in the system of FIG. 1

Referring now to FIG. 2, an exemplary description of one example of IMS/ETC core 108 within ENUM will now be described for illustrative purposes. IMS/ETC Core 108 in one example comprises IMS Core 152 and ETC 154. IMS Core 152 in on example provides the functionality by which call IP connections are established, maintained, and terminated on first network. For example, a call between two first network devices 1 may be established, maintained, and terminated by IMS Core 152. In addition, IMS Core 152 may process internet calls upon receipt of routing information from the sending and recipient network.

ETC 154 in one example provides provisioning interface 156 and egress routing component 158. Provisioning interface 156 in one example comprises the functionality and/or rules which determine the form and/or function of the processing of calls to other networks. For example, if a first network device 1 initiates a call to a second network device 2, IMS Core 152 may not recognize the number of the second network device 2 or otherwise realize that the call is for a device outside the first network 101. IMS Core 152 will pass the processing of the call to provisioning interface 156. Provisioning interface 156 processes the call based on certain criteria, which will be discussed further herein. In the given example where a device is outside of network i.e. not within the network's private ENUM database, provisioning component, may respond to query 160 with an NAPTR or "Not Found." In one example, provisioning interface 156 processes calls in conjunction with egress routing component 158. Egress routing component 158 in one example comprises a plurality of query nodes 160. The nodes 160 are configured to communicate with other networks to query for and receive routing information such that inter-network connections may be established. In one example, nodes 160 may be breakout gateway control function (BGCF) nodes through which requests may be sent to other networks, such as second network 102 and third network 103, for routing information. In one example, a subset 166 of nodes 160 may include client device 164. In one example, client device 164 is an ENUM client. Client device 164 in one example provides functionality for node to communicate with other networks in accordance with one or more protocols.

For example, client device 164 may provide functionality for communicating with second network 102 or third network 103 in a specified manner. Therefore, if trigger logic were to receive notification of a call being initiated between a first network device 1 and a second network device 2, then ENUM trigger logic 156 may utilize the subset 166 of nodes 160 that include client device 164 to process the call. This would minimize use of resources because only those nodes 160 configured for operation with second network 102 and/or third network 103 would be utilized.

In contrast, if a call were to originate from a first network device 1 intended for another network (not shown), then ENUM trigger logic 156 may invoke all nodes 160 to communicate with all available networks to process the call. Such an approach would not minimize resources because certain nodes 160 would be used in a non-directed way.

Referring further to FIG. 2, it should be noted that the rules used by provisioning interface 156 to determine the protocol for processing a particular call may vary. Criteria that may be used include, but are not limited to, originating call attributes (e.g. calling number, calling location, originating service type), destination call attributes (e.g. called number, country code, national number), and other network eligibility criteria (e.g. cost, time of day, and priority). For example, trigger logic 156 may route all calls intended for a particular network or destination to a subset 166 of nodes 160 with a client device 164 configured to process such calls. In another example, network analytics may determine that a high percentage of calls take place between first network 101 and second network 102 during a particular time of day. Accordingly, trigger logic 156 may route a percentage of all calls during the time of day to a subset 166 of nodes 160 with a client device 164 configured to request and receive routing information relating to network 102.

It should be noted that the preceding examples were provided for illustrative purposes. ENUM trigger logic 156 may use other criteria to distribute calls among nodes 160. The decision of which specific nodes 160 to include in subset 166 and/or to use for a given call may be based on various call distribution techniques, including but not limited to sequential, proportional, equal (round robin), and the like. Furthermore, the nodes 160 within subset 166 that are configured with various client devices 164 may change over time. For example, nodes 160 may be either manually or automatically allocated and/or removed depending on demand. Nodes 160 with the client device 164 may be added to egress routing component 158 to ensure sufficient query capacity is available for one or more networks, e.g., during periods of higher network call volumes or upon failure or maintenance outages of previously deployed nodes 160. Similarly, unneeded nodes 160, with or without a client device 164, may be removed during periods of lower call volume or to remove temporarily added capacity. For example, network analytics may be performed and client devices 164 may be added or subtracted depending on whether network traffic exceeds or does not exceed a predetermined threshold. In addition, client devices 164 may be selectively added or removed from nodes 160 based on network analytics.

Finally, it should be noted that the function of nodes 160 may be divided. For instance, a BGCF may be separated from the client device 164. For example, there may be a plurality of BGCF devices and a plurality of client devices 164. Client devices 164 could then invoke BGCF devices as needed. Similarly, if trigger logic 156 were to determine to send general carrier query, trigger logic 156 may bypass client devices 164 and invoke BGCF devices as needed.

The methods to convey the topology of egress routing component 158 to trigger logic 156 may include, but are not limited to, direct provisioning of eligible Carrier ENUM Client node IP addresses or use of Fully Qualified Domain Names (fqdns) to identify the eligible Carrier ENUM Client nodes 160 and/or client devices 164.

To summarize, ETC 154 in one example comprises logic and/or rules that determine whether or not a call from an originating first network device 1 to a recipient device should trigger a query to a Tier 1 and/or Tier 2 ENUM database to identify routing information on another network. In one example, if ETC 154 determines that a call should trigger a query to a Tier 1 and/or Tier 2 database on another network, then ETC 154 may select a subset of the egress client nodes 160 that are configured to query for connection information relating to the other networks. ETC 154 in one example causes the subset of egress devices to query the at least one other network for the connection information relating to the second network. In another example, ETC 154 may determine that a general carrier query should be performed for a particular call in which case all available nodes 160 may be used to request routing information from all available carriers. ETC 154 in one example receives the connection information relating to the second network. In one example, ETC 154 sends the connection information to IMS core 152 which uses the connection information in establishing an IP connection between the first network device 1 and the recipient.

Referring back to FIG. 1, first network 101 in one example includes A-SBC 112 and I-SBC 114 which are session border controllers (SBCs) used to access the first network 101. In general, a SBC is a device that is used by VoIP providers to control signaling and media streams involved in setting up, conducting and taking down VoIP calls. Thus, an SBC may be placed in the VoIP signaling path between the calling and called terminals. In addition to call setup and takedown, an SBC can provide, among other things, access control, and data conversion services for the calls they control. In some cases, an SBC can act as a user agent for a terminal within its network, which allows a network to exercise additional control over calls within the network.

Referring further to FIG. 1, second network 102 is shown as including an ENUM database 116 and a SBC 118. It should be understood, however, that second network 102 would also include components that are not shown, such as other SBCs, ENUM databases, and IMS cores. ENUM database 116 provides routing information for devices residing on second network 102 that may be used to establish calls with devices on other networks. SBC 118 is used by second network 102 to set up, control, and take down calls for devices on second network 102.

Referring further to FIG. 1, third network 103 in one example includes a ENUM database 120, SBCs 122, 124, and DNS 126. ENUM database 120 in one example provides routing data for ENUM databases of networks connected to third network 103 (e.g. network 101 and network 102). SBCs 122, 124 provide access to third network 103, and DNS 103 provides a domain name server that includes information relating to ENUM databases identified in ENUM database 120.

Referring now to FIG. 1, an exemplary description of a method of operation of system 100 will now be provided for illustrative purposes. In one example first network device 1 accesses first network 101 through A-SBC 112 and initiates a call 151 by inputting a E.164 number. IMS/ETC Core 108 sends a query 153 to private ENUM 104 for the called E.164. Private ENUM 104 sends a response 155 to ETC 110.

In one example, if the call were for another first network device 1, the response 155 may include the routing data for device 1 to be connected to the other first network device 101. IMS/ETC Core could then complete the call between the two first network devices 1.

In another example, the call may be intended for a second network device 2. Accordingly, the response 155 may include a pointer or some other indicator that second network device 2 resides on second network 102. In another example, private ENUM 104 may have records identifying that routing information for second network devices can be found on Tier 1 ENUM 120 of third network. Such a response 155 may indicate call should be routed accordingly.

Accordingly the response 155 may indicate that the second network device 2 resides on the second network 102. Provisioning interface 156 of IMS/ETC Core 108 would then in accordance to its rules select subset 166 of nodes 160 to forward an ENUM query 157. In one example, the ENUM query 157 would be populated with information such that the query 157 would bypass the private ENUM 104 and go to ENUM 120 of third network 103. The ENUM 120 sends a response 159. In one example, the response 159 includes the NS records of ENUM 116 of the second network 102. IMS/ETC Core 110 would then send a request 161 for DNS 126 to provide it with destination information for the ENUM 116. DNS 126 would resolve the ENUM 116 of the second network 102 and send a response 163 to IMS/ETC Core 108. IMS/ETC Core 108 sends a query 165 to ENUM 116. The ENUM 116 identifies the entry for device 2 and sends a response 167. In one example, the response 167 includes an NAPTR with SBC 118 through which second network 102 wants to accept calls from first network. IMS/ETC Core 108 routes the call 151 through I-SBC 114 to SBC 124 of third network 103. Third network in response routes call 151 through SBC 122 to SBC 118 of second network and to device 2. It should be noted that the above call flow is provided for illustrative purposes only. Other flows are also encompassed by this disclosure. For instance, first network 101 may send the call 151 directly to second network 102, e.g., through SBC 114 and SBC 118.

Referring to FIG. 1, another example of intercarrier connectivity is described for illustrative purposes. Certain carriers may elect to form third network 103 as an IPX network to facilitate inter-network connectivity between their subscribers. Third network 103 would host a Tier 1 ENUM 120, which would include NS record of the Tier 2 ENUM 116 of participating networks, including second network 102. E.164 calling information may be stored in first network's private ENUM 104 as a new domain, e.g., xyz.net instead firstnetwork.net. Upon initiation of a call to a second network device 102, the private ENUM 104 response 155 would include the domain "xyz.net. IMS/ETC Core 108 resolves xyz.net to a subset 166 of nodes 160 with client device 164 and routes the call to those nodes 160. Nodes 160 will initiate an ENUM query to Tier 1 ENUM 120. In one example, the query may include the domain e164enum.net. Tier 1 ENUM 120 will return NS records of second network 102 Tier 2 ENUM 116. IMS/ETC Core 108 resolve second network Tier 2 ENUM 116 using DNS infrastructure 126 of third network. IMS/ETC Core 108 then queries Tier 2 ENUM 116 for routing data. The Tier 2 ENUM 116 responds with SBC 118 to complete the call. It will be understood that the example of use of a third network 103 is provided as an optional example and is not a necessary to the service activation system and method described more completely below. The service activation system and method may be used in connection with any ENUM environment.

With reference to FIGS. 2A-2F, a service activation system and method according to various examples will be described. Activation refers to both activation and deactivation of a service or a record. The service activation system 200 operates in an ENUM environment, including but not limited to the examples discussed above. This example of ENUM is not limiting. In general, ENUM hosts customer data and relies on private names servers (NSs), such as CLIMS, USP, vUSP and the like. System 200 may be implemented in connection with various networks including but not limited to telecommunications networks, software defined networks (SDNs), and other virtualized environments. Examples of these networks are provided below. System 200 replaces manual circuit-switched fall back based on modifications of zone files. System 200 activates specific services S or records R in an IP-based Multimedia Session Initiation (IMSI). In the example, system 200 (for example, a provisioning module 235) can implement logic to automatically and, in some cases manually, activate a specific service S and/or record R.

Figure 2A:
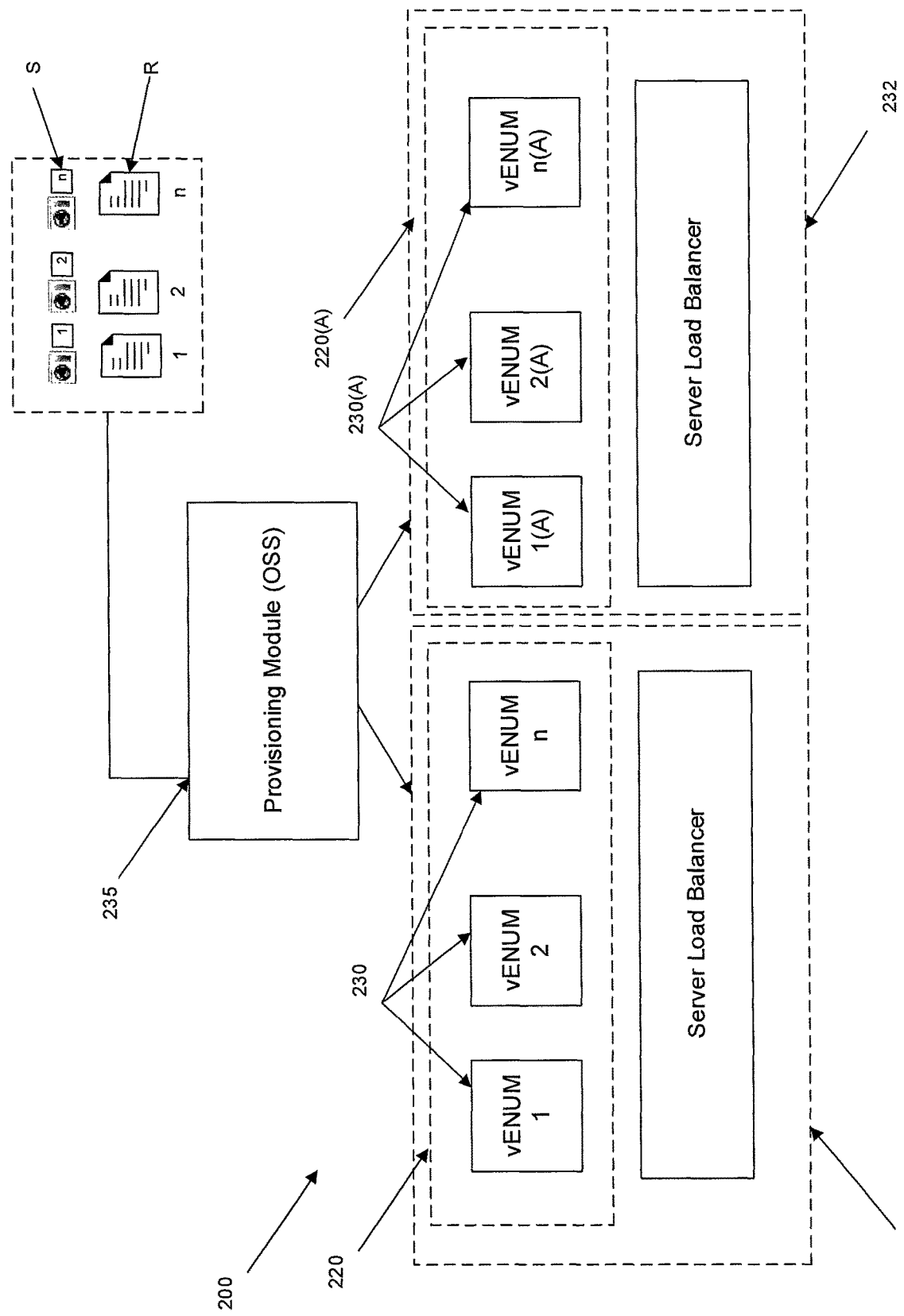
FIG. 2A is a schematic view of an activation/deactivation system according to an example.

System 200 includes an agent 220 that may be implemented as a dedicated apparatus, a network device or as a virtual machine (VM) within a virtual network function (VNF). FIG. 2A shows an example, where agent 220 is instantiated as a virtual machine or network device in a software defined network. Agent 220 may include one or more vENUM machines 230. Each vENUM 230 may be associated with or assigned to a virtual availability zone (AVZ). In the example a first AVZ 231 and a second AVZ 232 are shown. It will be understood that fewer or greater AVZs may be used as well. An AVZ may be defined based on geographical location, or other criteria. In the example, a first agent 220 having one (or more) vENUM instance(s) 230 are assigned to a first AVZ 231 and a second agent 220(A) having one or more vENUM 230(A) are assigned to second AVZ 232. System 200 may include a provisioning module 235 that defines the one or more AVZs. Provisioning module may be an OSS as shown in FIG. 2A. As schematically indicated the agent 220 via vENUM 230 may initiate an IMSI for at least one of a service S and a record R. As shown, the number of services or records is not limited and may include services S1, S2 . . . Sn or records R1, R2 . . . Rn. To address additional volume, the number of vENUM may be scaled up as needed.

Figure 2B:
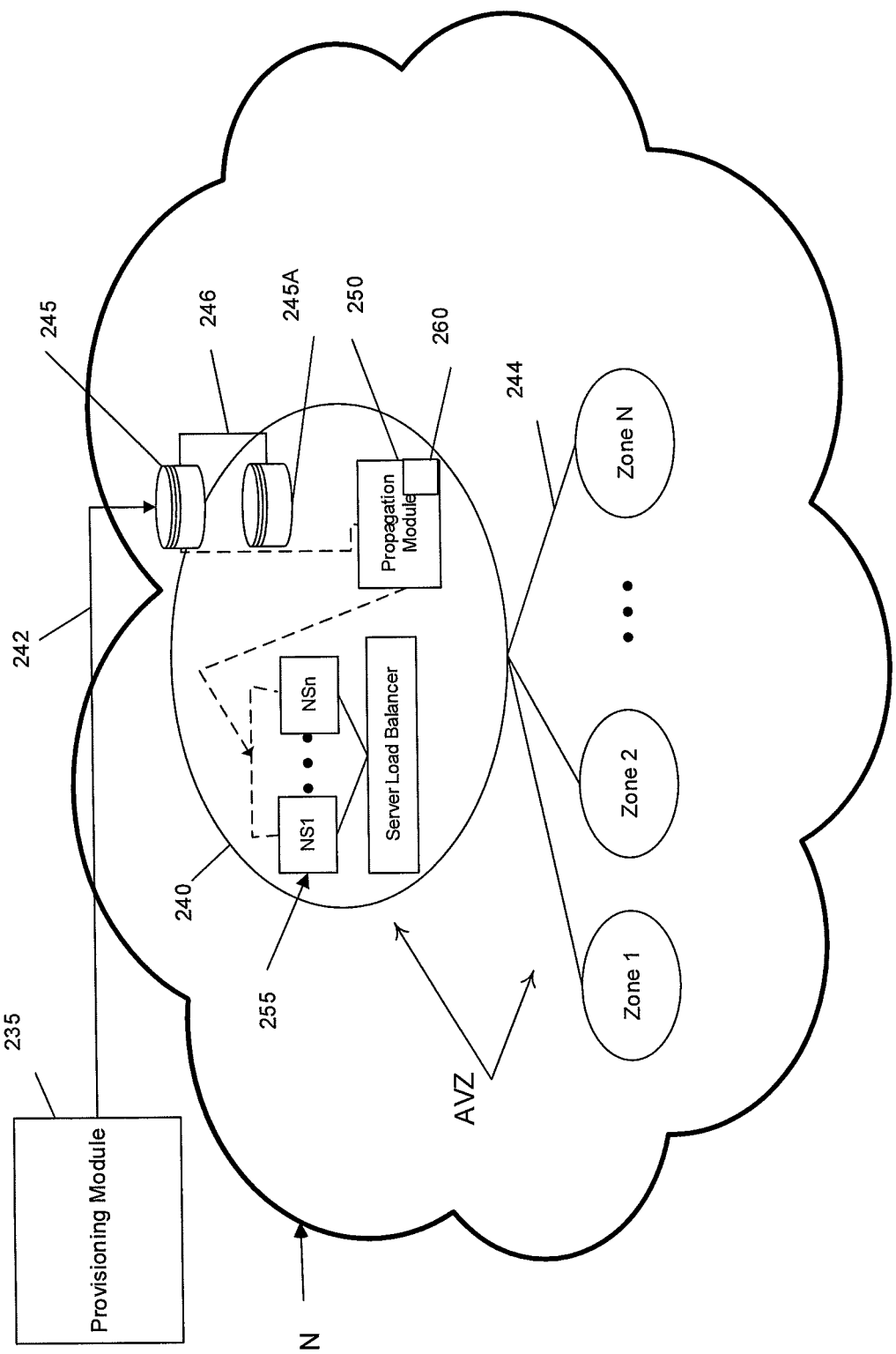
FIG. 2B is a schematic depicting further details of an activation/deactivation system according to an example.

With reference to FIG. 2B, an example is shown where provisioning module 235 may be configured to use one AVZ as a national provisioning zone (NPZ) 240. NPZ 240 may be defined within a network N, which may, as shown, be a cloud based network. Additional AVZs may be configured and may also back up the national provisioning zone (NPZ). To that end, provisioning module 235 may provision data to NPZ at 242 and fail over to another AVZ for back up While the example includes a geographic based provisioning of the AVZ i.e. national zone, other criteria or random method may be used to provision an AVZ and back up zones. With back up zones defined, provisioning module 235 may propagate data to one or more AVZs (Zone 1, Zone 2 . . . Zone N) at 244. Any AVZ can be active, inactive, accessible or inaccessible at any time. In one example, some of the AVZs (including the NPZ) can be assigned an available and accessible role, and back up zones are unavailable/inaccessible until needed.

Using NPZ as an example of an AVZ, NPZ 240 may include at least one database 245 that stores data from provisioning module. At least one back up database 245A may be provided with copies of data stored in database 245 at 246. AVZ may include a propagation module 250 responsible for the at least one virtual availability zone. The propagation module 250 communicates with database(s) 245 associated with NPZ 240 and at least one name server, generally indicated at 255.

As shown in FIG. 2A, agent 220 may include plural vENUM virtual machines operating in parallel to initiate plural IMSI sessions. As indicated above, each vENUM may be assigned to an AVZ (231, 232). Each AVZ may include plural vENUM operating in parallel. To that end, provisioning module 235 may define a queue 260 for each IMSI session within propagation module 250 as shown in FIG. 2B. While reference has been made to the NPZ 240 as an example of an AVZ, it will be understood that each AVZ, such as Zone 1, Zone 2 . . . Zone n may be instantiated and operated according to the examples described herein.

Figure 2C:
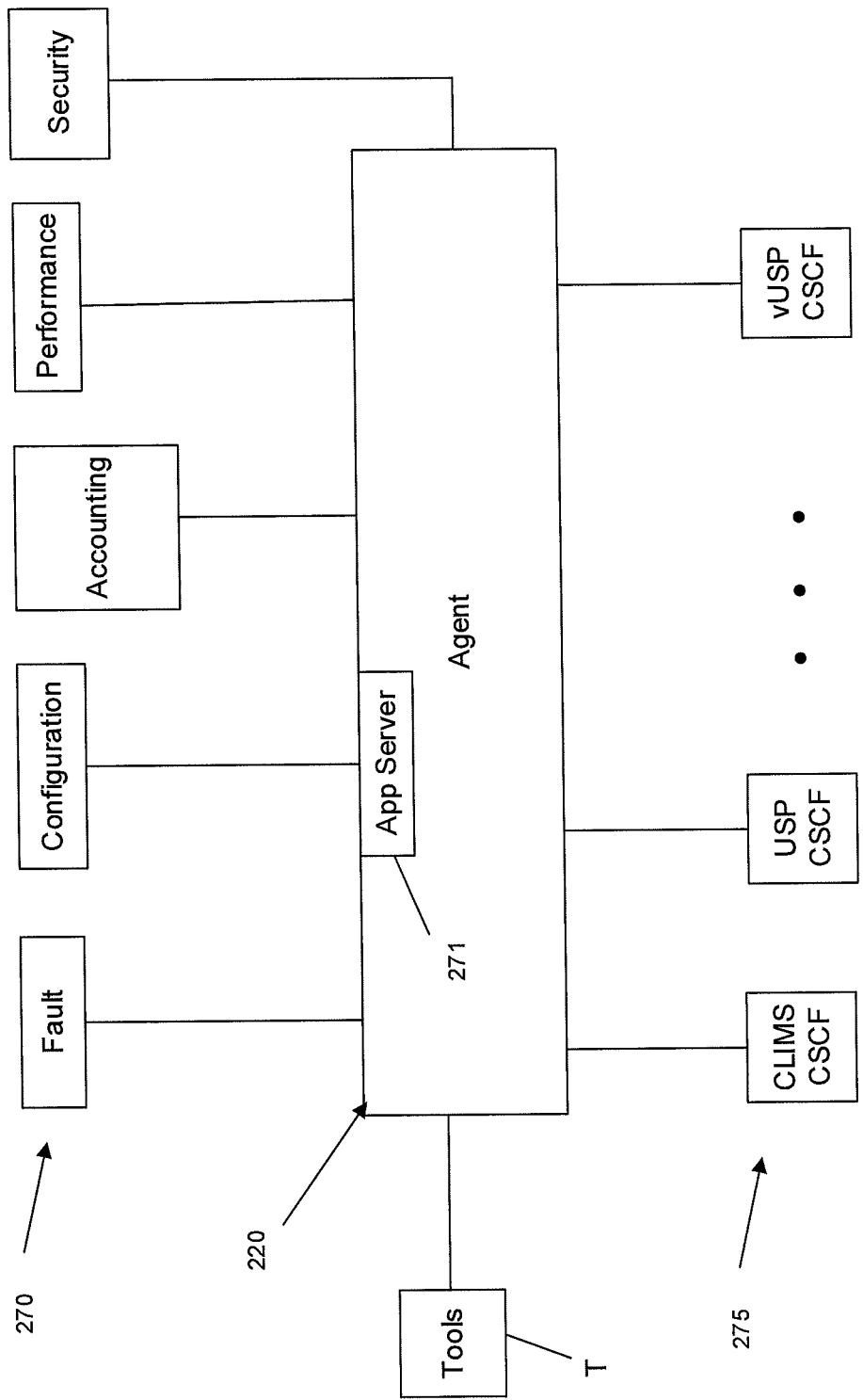
FIG. 2C is a flow diagram depicting operation of a system according to an example.

As shown in FIG. 2C, agent 220 may communicate with various infrastructure service systems 270 including but not limited to fault, configuration, accounting, performance, and security modules. To facilitate communication with one or more of the infrastructure systems 270, agent 220 may include an app server 271. In addition, agent 220 may communicate with name servers 275 including but not limited to CLIMS, USP, vUSP and the like. Additional examples include Skyfall, Trinity, VoLTE, CVoIP on USP, UM CFNs, VVM, ALU, MSw and the like. FIG. 2C further shows an example of agent 220 being incorporated as an apparatus within an existing set of configuration components/tools T. These tools T may effect which records R are enabled/disabled.

Figure 2D:
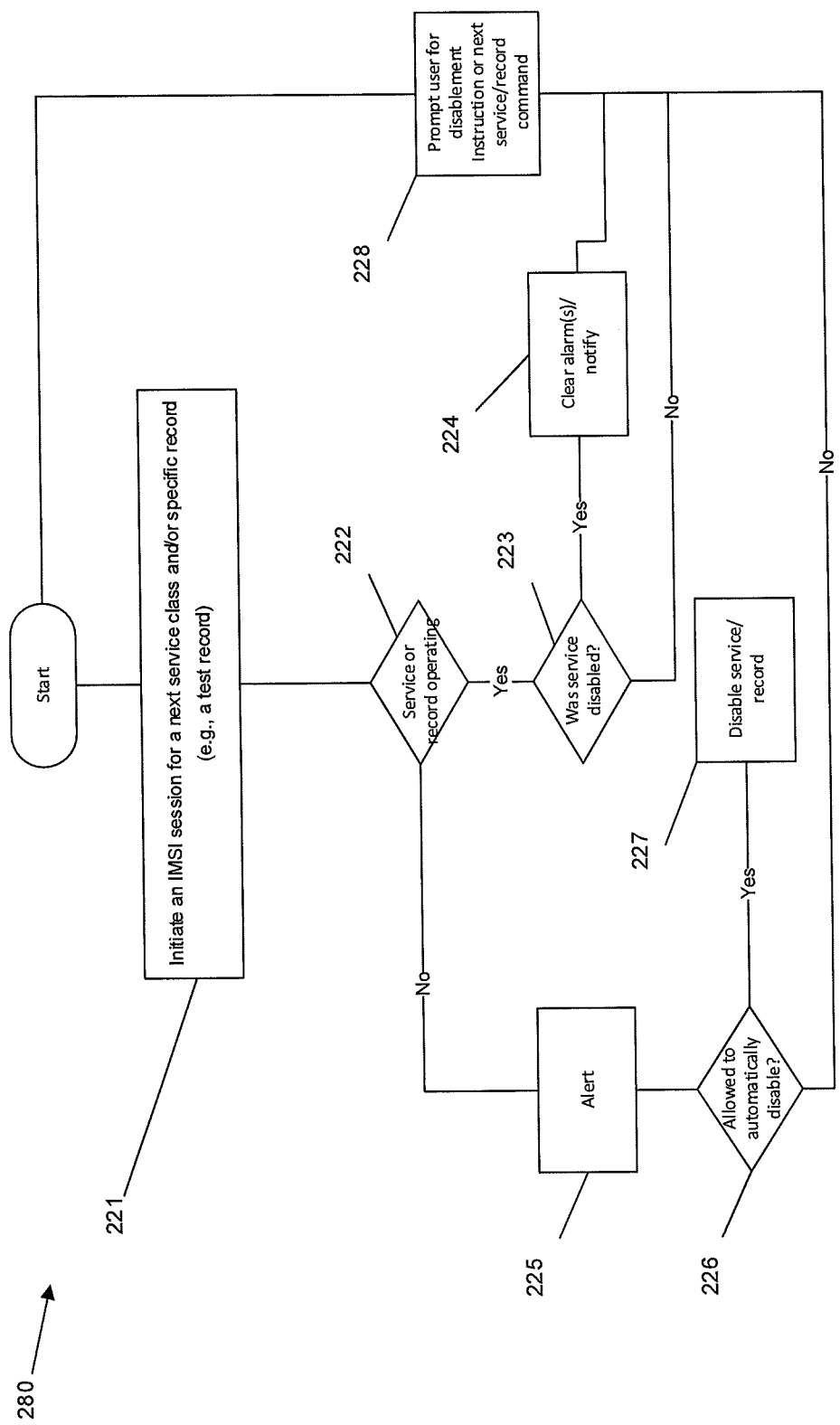
FIG. 2D is a flow diagram depicting another operation of a system according to an example.
Figure 2E:
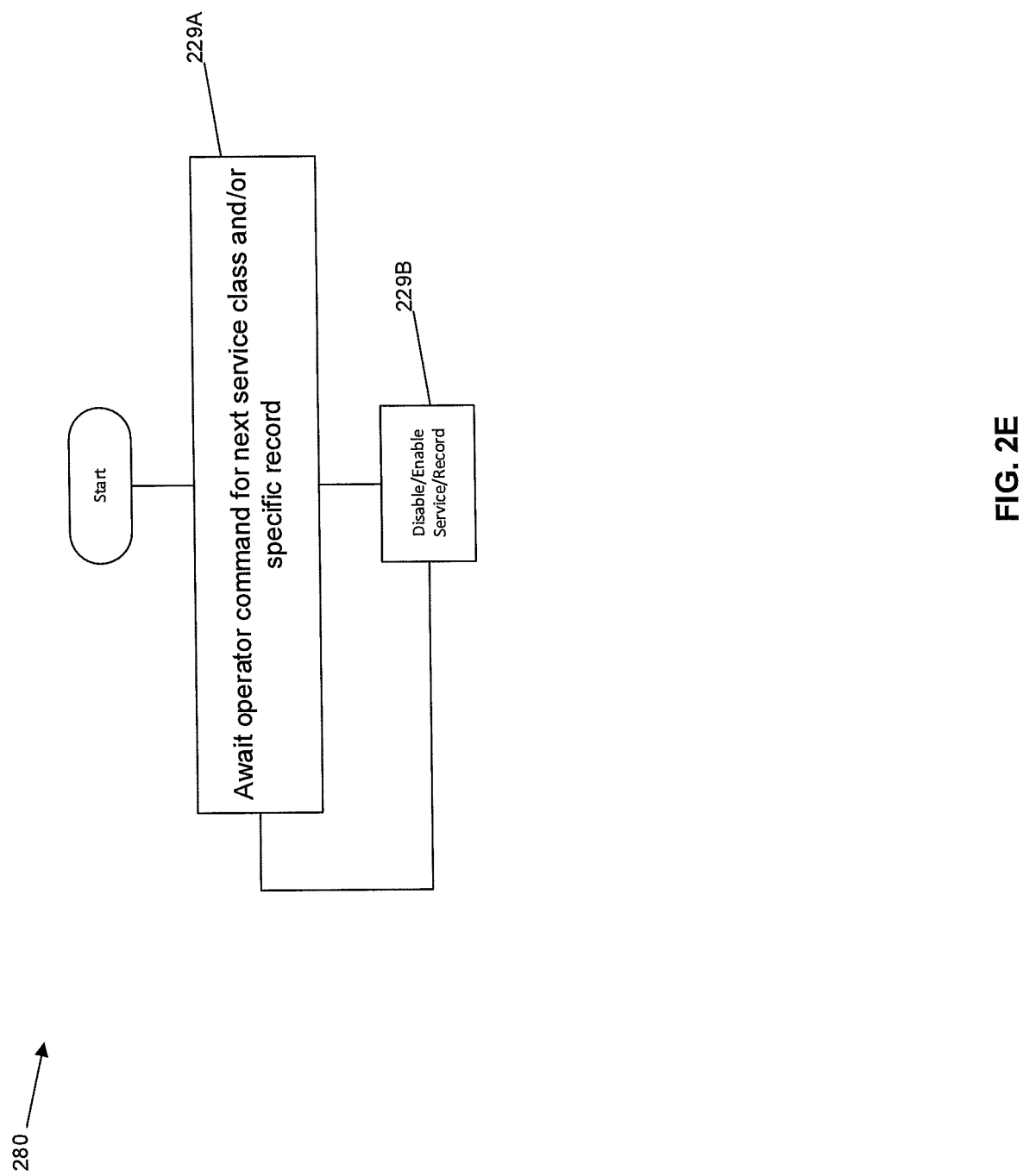
FIG. 2E is a schematic view depicting operation of a system according to an example.

With reference to FIGS. 2D and 2E agent 220 may include a processor coupled to memory. The memory includes instructions executed by the processor to perform an activation method generally indicate at 280. With reference to FIGS. 2C and 2D, agent 220 may initiate an IMSI session for a service or a record at step 221. Once initiated, a determining step 222 is performed to determine if at least one of a service or a record is operating. If the at least one of the service and the record is operating, an additional step of determining if the service was disabled is performed at 223. If the service was disabled, processor may clear any alarm and announce service disabled at 224 via input/output device. If step 222 determines that at least one of the service and the record is not operating, processor may generate an alarm at step 225 via input/output device. Processor may further determine if automatic disablement is permitted at 226, and if permitted, automatically disable the at least one of the service and the record at 227. If automatic disablement is not permitted, prompt for a disablement instruction at 228 via input/output. Upon receipt of a disablement instruction, processor will disable the at least one of the service and the record. At step 228, prompt may include a request for identification of the next service or record and restart the method. With reference to FIG. 2D, agent 220 may alternatively receive an operator command at 229A specifying disablement or enablement of a specific service or record and act according to the command at 229B.

Figure 2F:
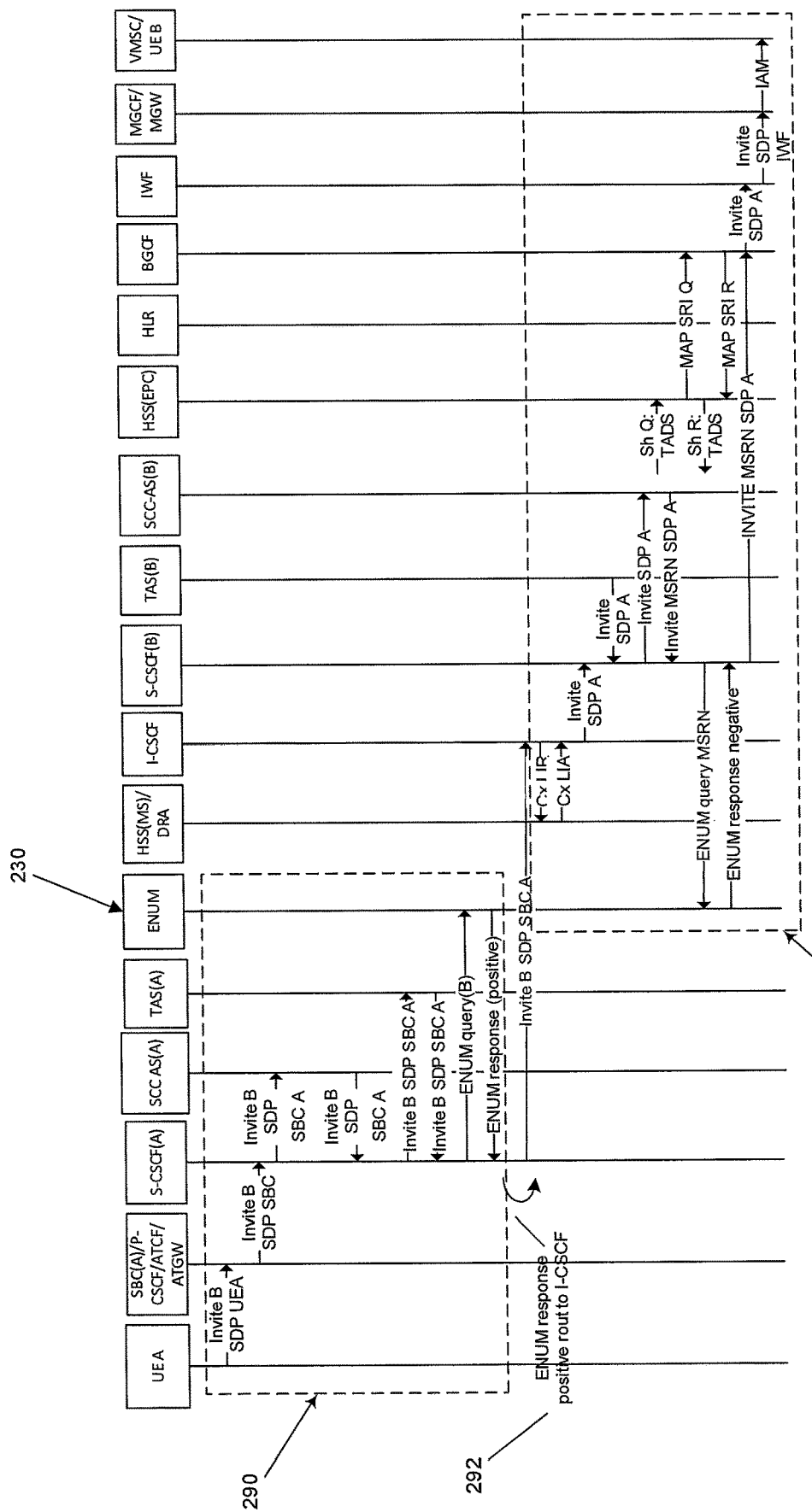
FIG. 2F is a partially schematic flow diagram depicting operation of the system according to an example.

FIG. 2F depicts an ENUM operation according to the examples described in connection with FIGS. 2D and 2E. In the example shown, a VoLTE MO-INVITE is shown communicating with ENUM 230 generally at 290. In general, ENUM 230 responds to a query at 292 with either a found (positive) or not found (negative) response. The response can be affected by provisioning rules, and therefore, is not limited to situations where the record is literally found within the private ENUM database. Provisioning rules may trump the presence of whether the record is found and provide a negative response when, despite the presence of the record, the network cannot provide a connection. In the example, when the ENUM response 292 is positive, the invite is routed to I-CSCF. With the positive indication, a VoLTE MT on 2G/3G Setup is performed at 295.

Figure 3:
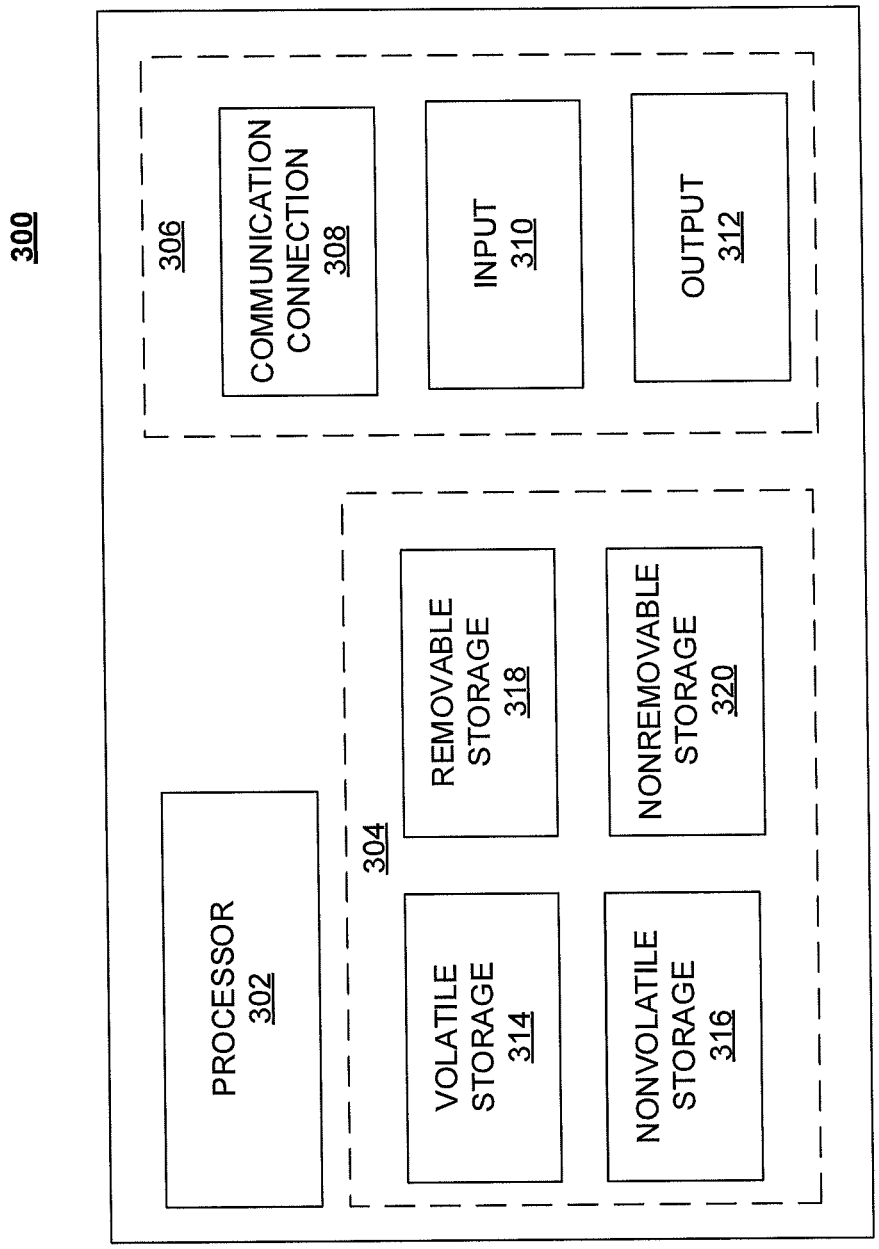
FIG. 3 is a schematic of an exemplary network device.
Figure 4:
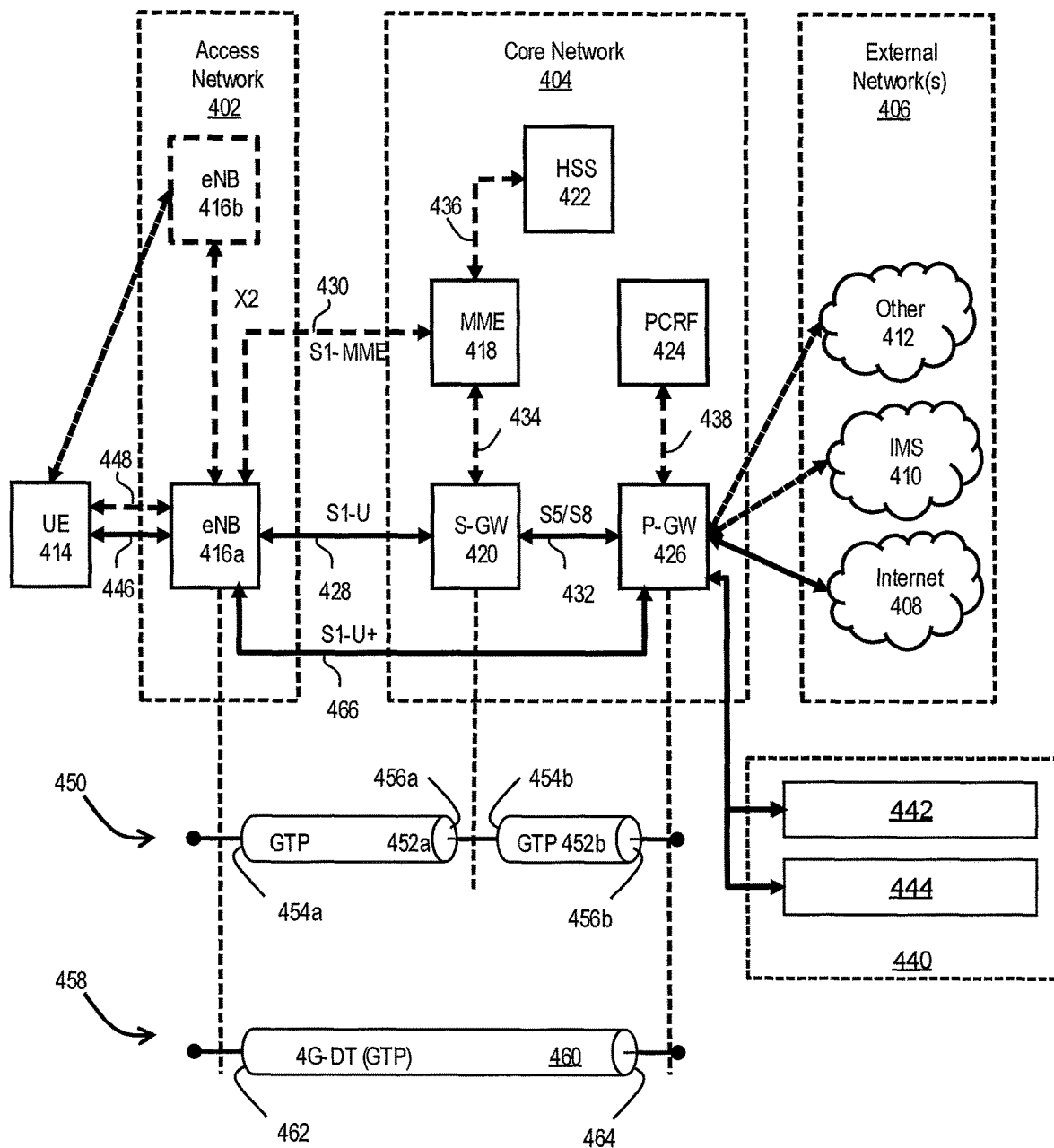
FIG. 4 depicts an exemplary communication system that provides wireless telecommunication services over wireless communication networks.

FIG. 3 is a block diagram of network device 300 that may be connected to or comprise a component of cellular network 112, wireless network 114, or software defined network described below. Network device 300 may comprise hardware or a combination of hardware and software. The functionality of system 200 of ENUM activation may reside in one or combination of network devices 300. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with ENUM activating or deactivating a service or record as described above. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to activate or deactivate a service or record. In examples, processor 302 may effectuate operations to perform activation and deactivation automatically. In other examples, processor 302 may receive at least one input via input/output device to trigger an activation or deactivation of a service and/or a record.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one example, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416$a$, 416$b$. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one example, the core network 404 includes various network entities, such as MME 418, SGW 420, Home Subscriber Server (HSS) 422, Policy and Charging Rules Function (PCRF) 424 and PGW 426. In one example, MME

418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all examples of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some examples, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some examples, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some examples, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some examples, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one example, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some examples, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some examples, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
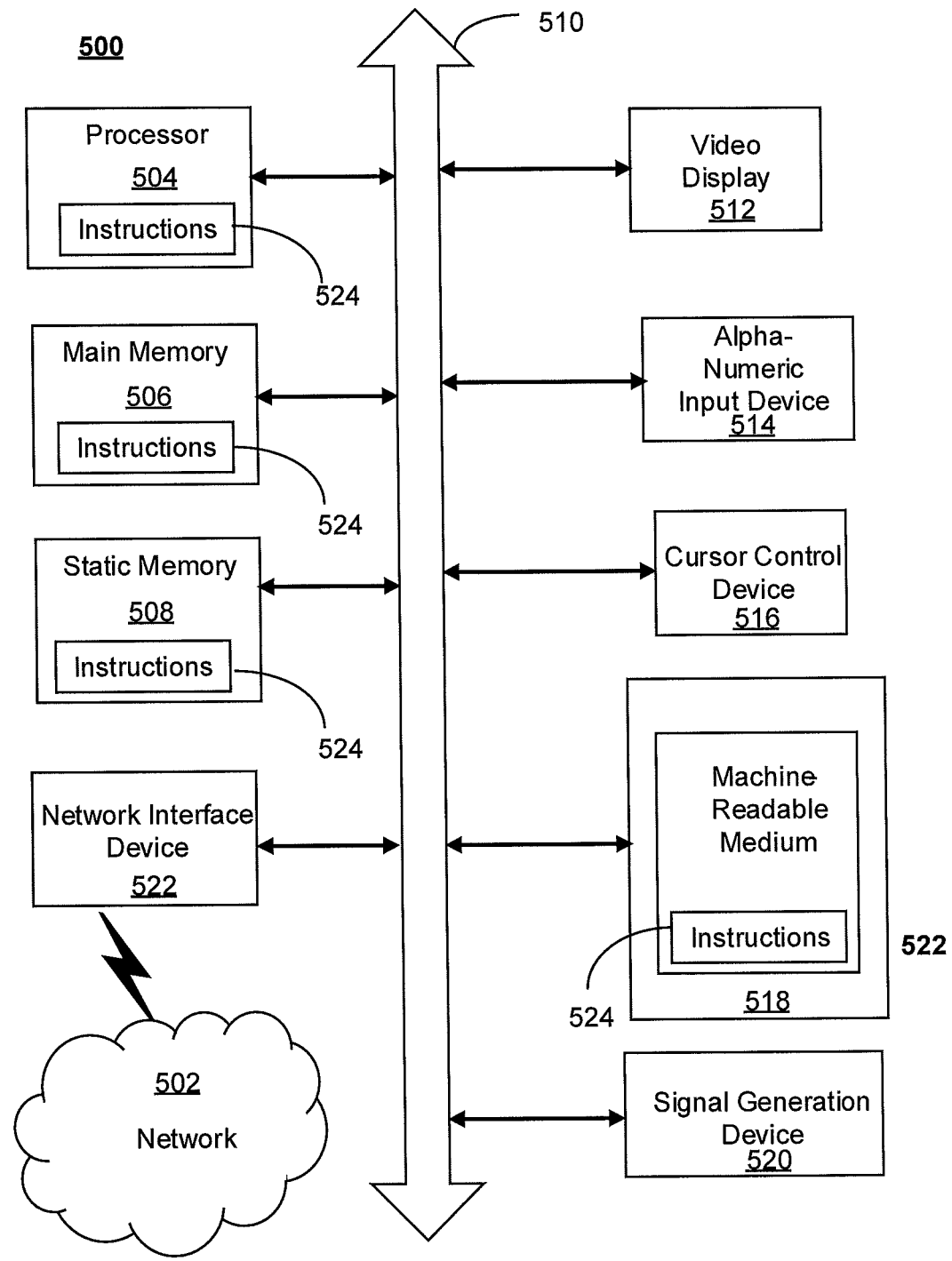
FIG. 5 depicts an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
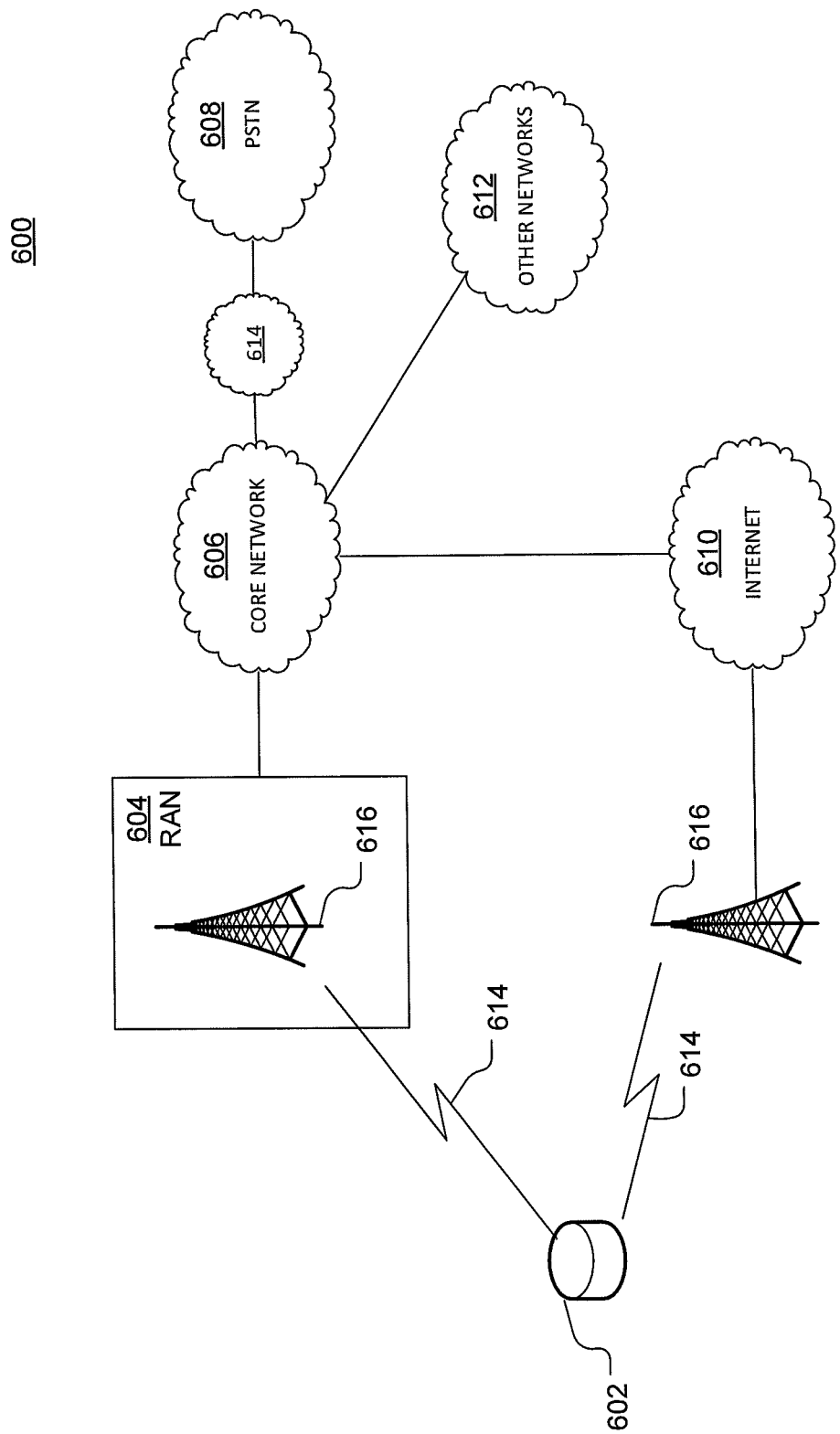
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA).

WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
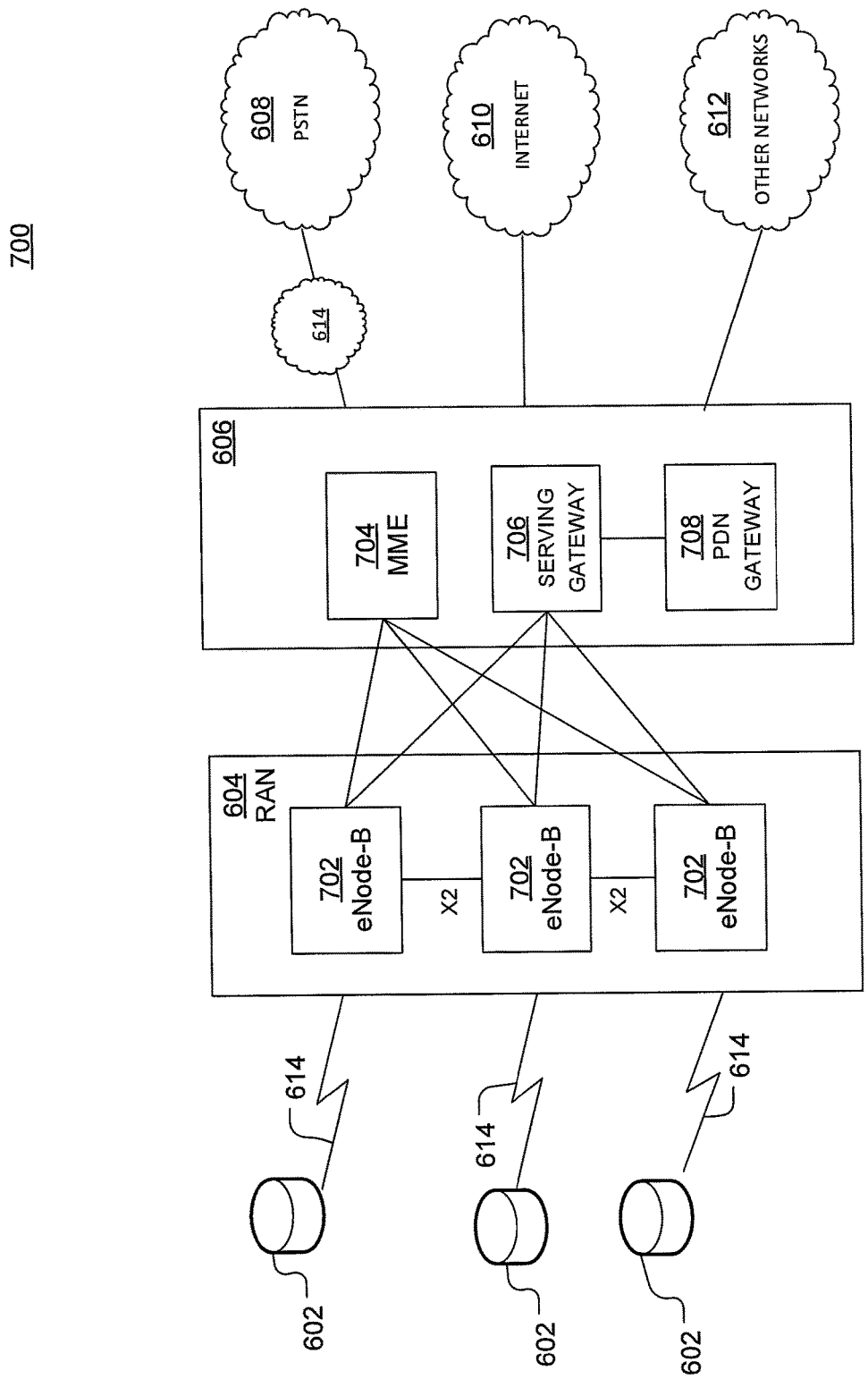
FIG. 7 is an example system diagram of a radio access network and a core network.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional land-line communications devices. In addition, core network 606 may provide the WTRUs 602 with access to other networks 612, which may include other wired or wireless networks that are owned or operated by other service providers.

Figure 8:
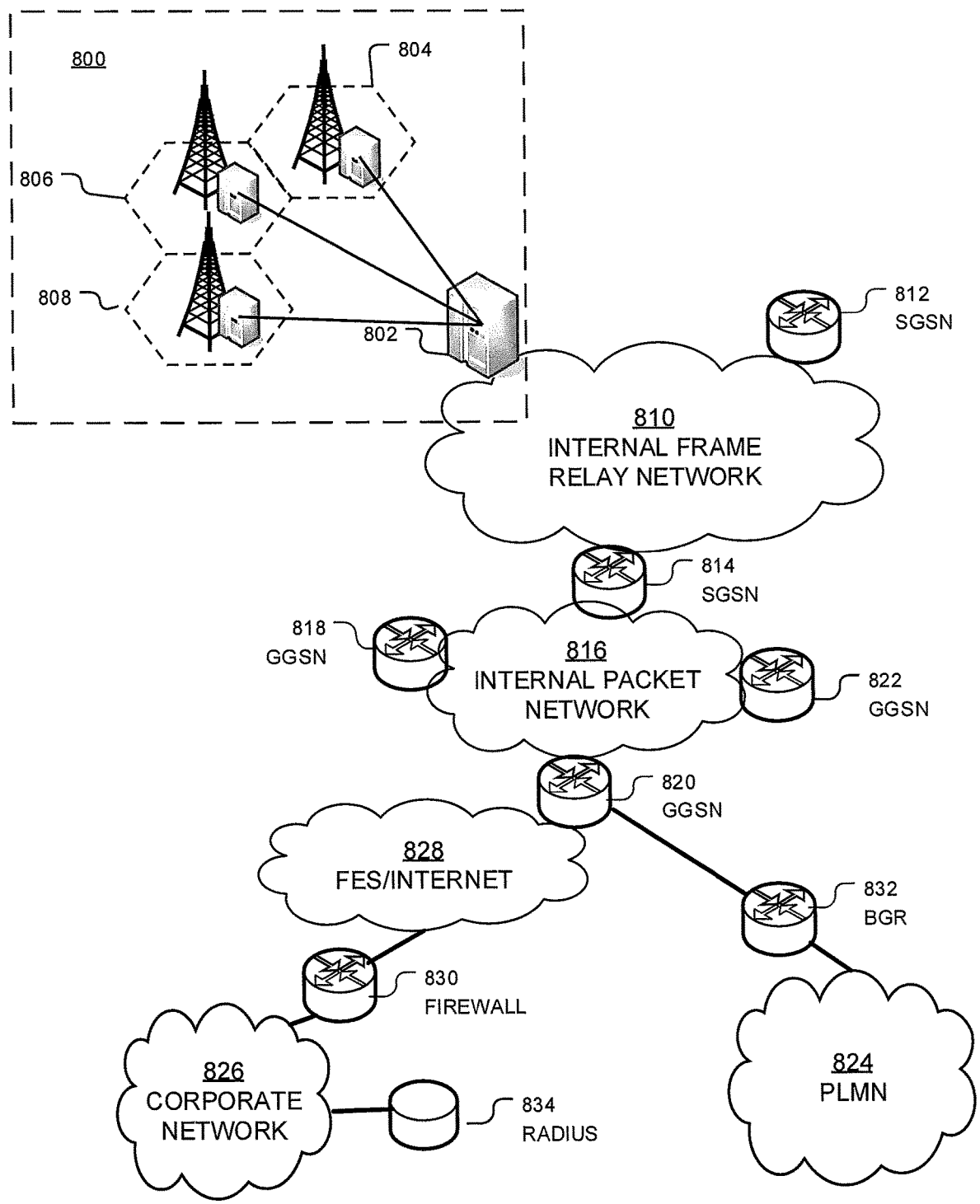
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
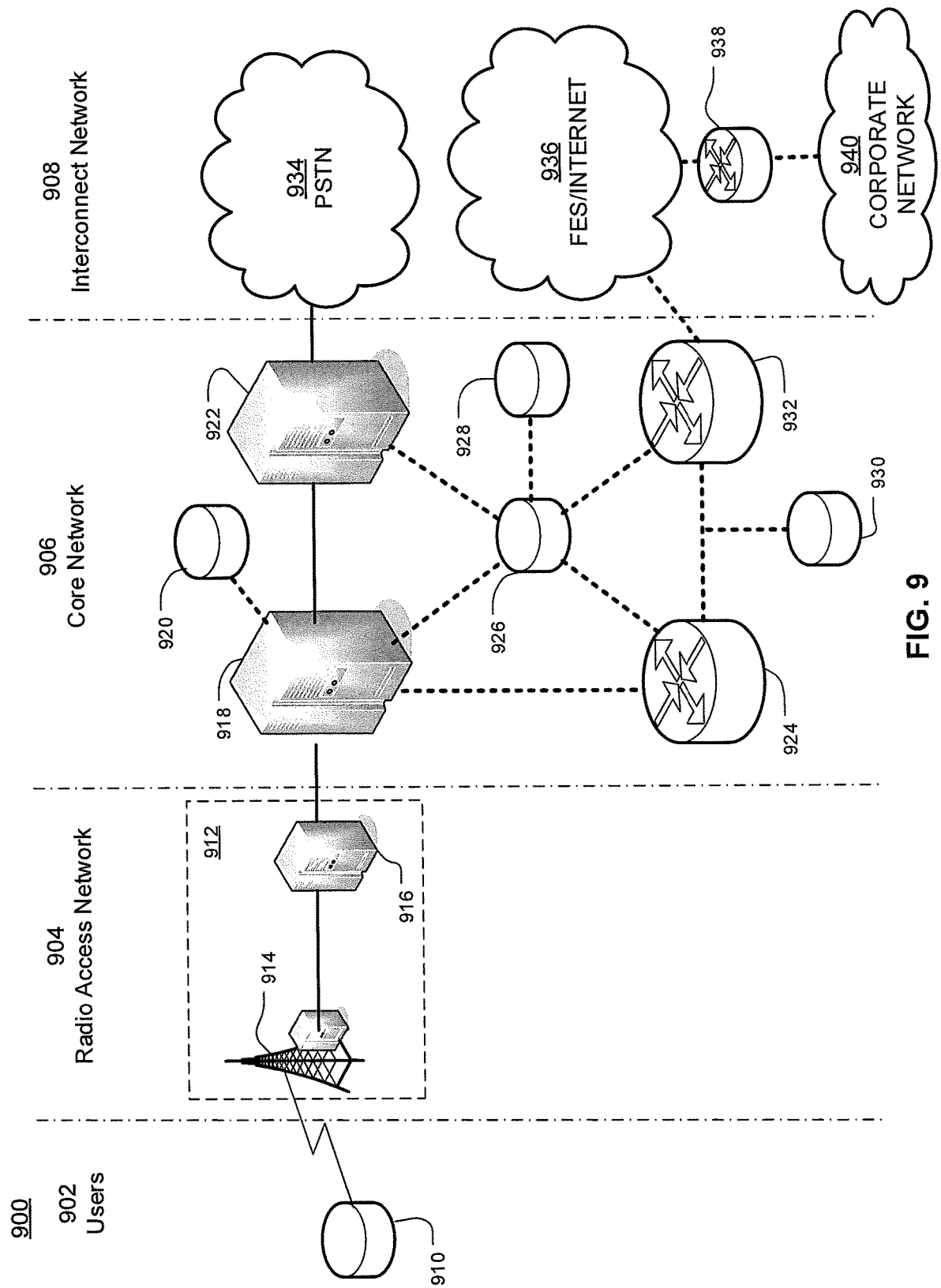
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., first network device 1, second network device 2, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
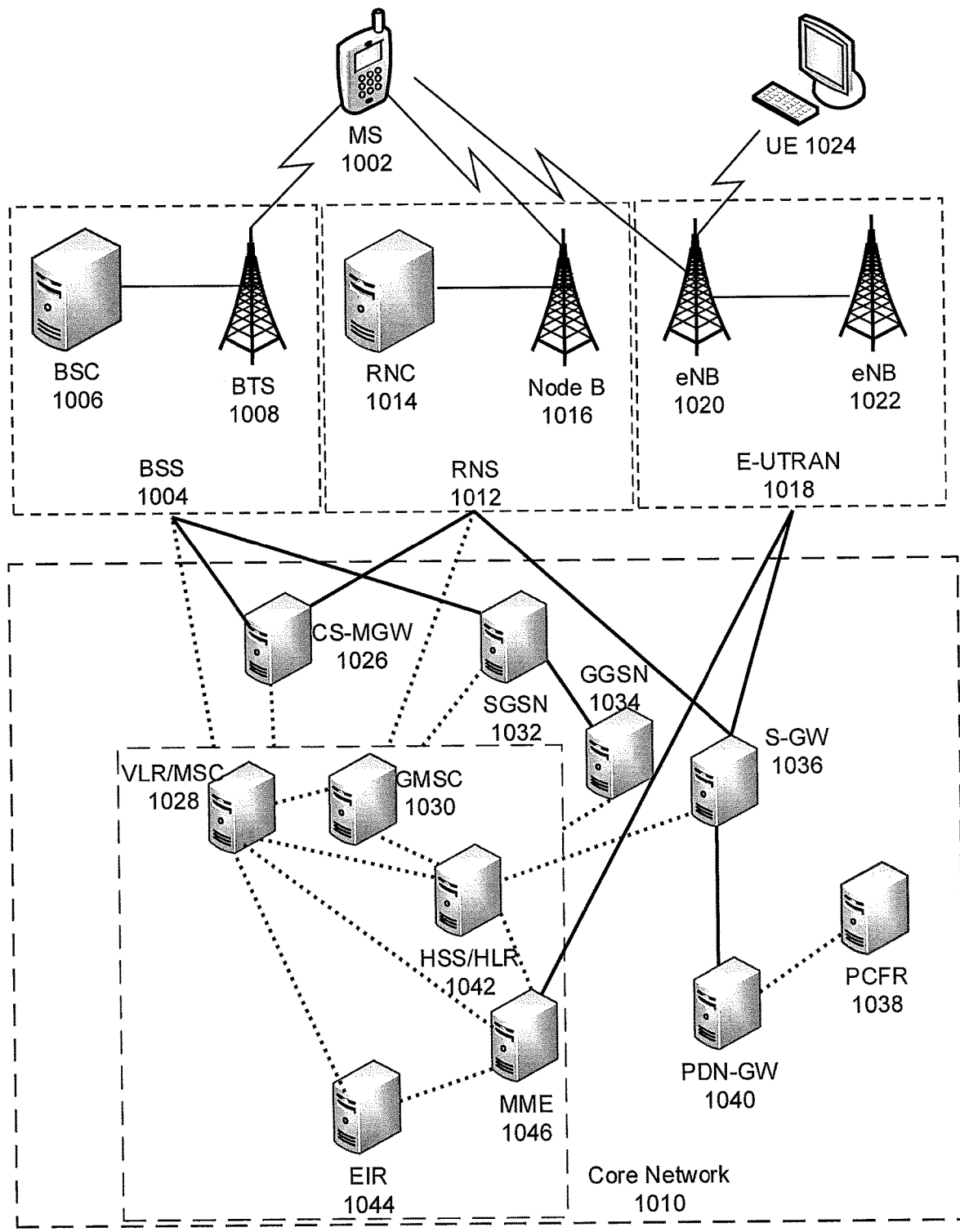
FIG. 10 is a block diagram of an exemplary public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

EXAMPLES

Example 1. A network device comprising a processor, an input/output device coupled to the processor, and a memory coupled with the processor, the memory comprising executable instructions that when executed by the processor cause the processor to effectuate operations comprising: instantiating at least one vENUM virtual, wherein the at least one vENUM virtual machine initiating an IMSI session for at least one of a service and a record; determining if the at least one of the service and the record is operating; if the at least one of the service and the record is operating, determining if the service was disabled, and if the service was disabled, clear any alarm and announcing service disabled via input/output device; if the at least one of the service and the record is not operating, generate an alarm via input/output device, determine if automatic disablement is permitted, and if permitted, automatically disable the at least one of the service and the record; if automatic disablement is not permitted, prompt for a disablement instruction via input/output and disable the at least one of the service and the record upon receiving the disablement instruction.

Example 2. The network device of example 1, wherein the operations further comprise awaiting a command an activate command for a identified service or record via input/output device; upon receiving the activate command, activating the identified service or record.

Example 3. The network device of example 1, wherein the operations further comprise awaiting a command a deactivate command for a identified service or record via input/output device; upon receiving the deactivate command, deactivating the identified service or record.

Example 4. The network device of example 1, wherein the operations further comprise automatically enabling the at least one of the service and the record after the step of announcing.

Example 5. The network device of example 1, wherein the operations further comprise prompting for a command to enable the at least one of the service and the record via input/output device and enabling the at least one of the service and the record after receiving the command to enable.

Example 6. The network device of example 1 wherein the operations further comprise defining at least one virtual availability zone, instantiating a propagation module responsible for the at least one virtual availability zone, wherein the propagation module communicates with a database associate with the virtual availability zone and a name server, and updates the database based on the determining steps of the vENUM.

Example 7. The network device of example 6 wherein the at least one vENUM virtual machine includes plural vENUM virtual machines operating in parallel to initiate plural IMSI sessions, and wherein the operations further comprise instantiating a provisioning module within the propagation module, the provisioning module responsible for at least one virtual availability zone, the provisioning module defining a queue within the propagation module for each IMSI session.

Example 8. The network device of example 6 wherein the step of instantiating at least one vENUM virtual machine includes assigning the at least one vENUM virtual machine to a virtual availability zone within the database.

Example 9. The network device of example 6, wherein the virtual availability zone corresponds to a geographic area.

Example 10. The network device of example 7 further comprising instantiating a collector module that examines the queue, wherein upon completion of the IMSI session, the collector module removes the IMSI session from the queue.

Example 11. An apparatus comprising at least one agent communicating with at least one of a fault, configuration, accounting, performance, and security module; the at least one agent communicating with at least one CSCF; the agent comprising a processor; and memory coupled to the processor, and an input/output device, the memory comprising executable instructions that cause the processor to effectuate operations comprising determining that a service is operating properly; if the service is operating properly and the service is disabled, enable the service; if the service is not operating properly, then generate an alarm and if the service is enabled, disable the service.

Example 12. The apparatus of example 11 further comprising an input device and an output device connected to the processor and wherein the step of determining further includes communicating the alarm via the output.

Example 13. The apparatus of example 12 further comprising communicating a notification via the output if the service is operating properly and the service is disabled, wherein the notification advises that the service was disabled.

Example 14. The apparatus of example 12, wherein the operations further comprise reviewing an additional service upon receiving a command identifying the additional service via the input device.

Example 15. The apparatus of example 11, wherein the at least one CSCF includes at least one of a CLIMS CSCF, a USP CSCF, and a vUSP CSCF.

Example 16. The apparatus of example 11, wherein the at least one agent comprises an app server.

Example 17. The apparatus of example 11, wherein the agent in incorporated within an ENUM tool.

Example 18. The apparatus of example 11, wherein the at least one service includes at least one of a multisim phone, a connected vehicle, and an internet of things device.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A network device comprising a processor, an input/output device coupled to the processor, and a memory coupled with the processor, the memory comprising executable instructions that when executed by the processor cause the processor to effectuate operations comprising:

instantiating at least one tElephone NUmber Mapping virtual machine (vENUM) instance, wherein the at least one vENUM instance initiates an internet protocol based multimedia session instantiated (IMSI) session for at least one of a service and a record;

determining if the at least one of the service and the record is operating;

when the at least one of the service and the record is operating, determining if the service was disabled, and if the service was disabled, clearing any alarm and announcing service disabled via the input/output device;

when the at least one of the service and the record is not operating, generating an alarm via the input/output device, determining if automatic disablement is permitted, and if permitted, automatically disabling the at least one of the service and the record; and when automatic disablement is not permitted, prompting for a disablement instruction via the input/output device and disabling the at least one of the service and the record upon receiving the disablement instruction.

2. The network device of claim 1, wherein the operations further comprise:

awaiting an activate command for an identified service or record via the input/output device;

upon receiving the activate command, activating the identified service or record.

3. The network device of claim 1, wherein the operations further comprise:

awaiting a deactivate command for an identified service or record via the input/output device;

upon receiving the deactivate command, deactivating the identified service or record.

4. The network device of claim 1, wherein the operations further comprise automatically enabling the at least one of the service and the record.

5. The network device of claim 1, wherein the operations further comprise:

prompting for a command to enable the at least one of the service and the record via the input/output device; and enabling the at least one of the service and the record after receiving the command to enable.

6. The network device of claim 1, wherein the operations further comprise:

defining at least one virtual availability zone; and instantiating a propagation module responsible for the at least one virtual availability zone, wherein the propagation module communicates with a database associated with the at least one virtual availability zone and a name server and updates the database.

7. The network device of claim 6, wherein the at least one vENUM instance includes a plurality of vENUM instances operating in parallel to initiate a plurality of IMSI sessions, and wherein the operations further comprise instantiating a provisioning module within the propagation module, the provisioning module responsible for the at least one virtual availability zone, the provisioning module defining a queue within the propagation module for each IMSI session.

8. The network device of claim 7, wherein the operations further comprise instantiating a collector module that examines the queue, wherein upon completion of the IMSI session, the collector module removes the IMSI session from the queue.

9. The network device of claim 6, wherein instantiating the at least one vENUM instance comprises assigning the at least one vENUM instance to a virtual availability zone of the at least one virtual availability zone.

10. The network device of claim 6, wherein the at least one virtual availability zone corresponds to a geographic area.

11. A method comprising:
instantiating, by a processor, at least one tElephone NUmber Mapping virtual machine (vENUM) instance, wherein the at least one vENUM instance initiates an internet protocol based multimedia session instantiated (IMSI) session for at least one of a service and a record;
determining, by the processor, if the at least one of the service and the record is operating;
when the at least one of the service and the record is operating, determining, by the processor, if the service was disabled, and if the service was disabled, clearing any alarm and announcing service disabled via an input/output device;
when the at least one of the service and the record is not operating, generating, by the processor, an alarm via the input/output device, determining if automatic disablement is permitted, and if permitted, automatically disabling the at least one of the service and the record; and
when automatic disablement is not permitted, prompting, by the processor, for a disablement instruction via the input/output device and disabling the at least one of the service and the record upon receiving the disablement instruction.

12. The method of claim 11, further comprising:
defining at least one virtual availability zone; and
instantiating a propagation module responsible for the at least one virtual availability zone, wherein the propagation module communicates with a database associated with the at least one virtual availability zone and a name server and updates the database.

13. The method of claim 12, wherein the at least one vENUM instance includes a plurality of vENUM instances operating in parallel to initiate a plurality of IMSI sessions, and wherein the operations further comprise instantiating a provisioning module within the propagation module, the provisioning module responsible for the at least one virtual availability zone, the provisioning module defining a queue within the propagation module for each IMSI session.

14. The method of claim 13, further comprising instantiating a collector module that examines the queue, wherein upon completion of the IMSI session, the collector module removes the IMSI session from the queue.

15. The method of claim 12, wherein instantiating the at least one vENUM instance comprises assigning the at least one vENUM instance to a virtual availability zone of the at least one virtual availability zone.

16. The method of claim 12, wherein the at least one virtual availability zone corresponds to a geographic area.

17. A computer-readable storage medium storing executable instructions that when executed by a computing device cause said computing device to effectuate operations comprising:
instantiating, by a processor, at least one tElephone NUmber Mapping virtual machine (vENUM) instance, wherein the at least one vENUM instance initiates an internet protocol based multimedia session instantiated (IMSI) session for at least one of a service and a record;
determining, by the processor, if the at least one of the service and the record is operating;
when the at least one of the service and the record is operating, determining, by the processor, if the service was disabled, and if the service was disabled, clearing any alarm and announcing service disabled via an input/output device;
when the at least one of the service and the record is not operating, generating, by the processor, an alarm via the input/output device, determining if automatic disablement is permitted, and if permitted, automatically disabling the at least one of the service and the record; and
when automatic disablement is not permitted, prompting, by the processor, for a disablement instruction via the input/output device and disabling the at least one of the service and the record upon receiving the disablement instruction.

18. The computer-readable storage medium of claim 17, wherein the operations further comprise:
defining at least one virtual availability zone; and
instantiating a propagation module responsible for the at least one virtual availability zone, wherein the propagation module communicates with a database associated with the at least one virtual availability zone and a name server and updates the database.

19. The computer-readable storage medium of claim 18, wherein the at least one vENUM instance includes a plurality of vENUM instances operating in parallel to initiate a plurality of IMSI sessions, and wherein the operations further comprise instantiating a provisioning module within the propagation module, the provisioning module responsible for the at least one virtual availability zone, the provisioning module defining a queue within the propagation module for each IMSI session.

20. The computer-readable storage medium of claim 18, wherein instantiating the at least one vENUM instance comprises assigning the at least one vENUM instance to a virtual availability zone of the at least one virtual availability zone.

* * * * *